Figure 1:
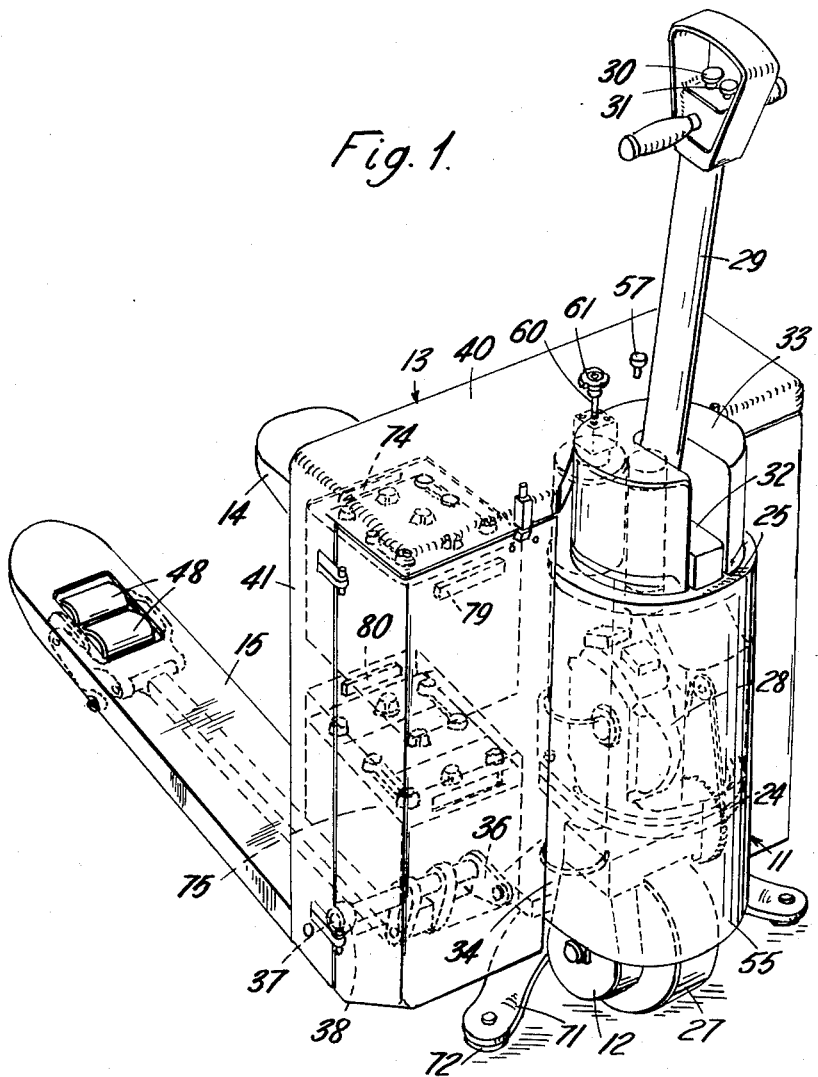

Aug. 24, 1965    J. R. V. DOLPHIN ETAL    3,202,233
PALLET OR STILLAGE TRUCKS

Filed May 6, 1963    4 Sheets-Sheet 1

INVENTORS
John R. V. Dolphin
Cecil Goodacre

BY E. I. LeFates
ATTORNEY

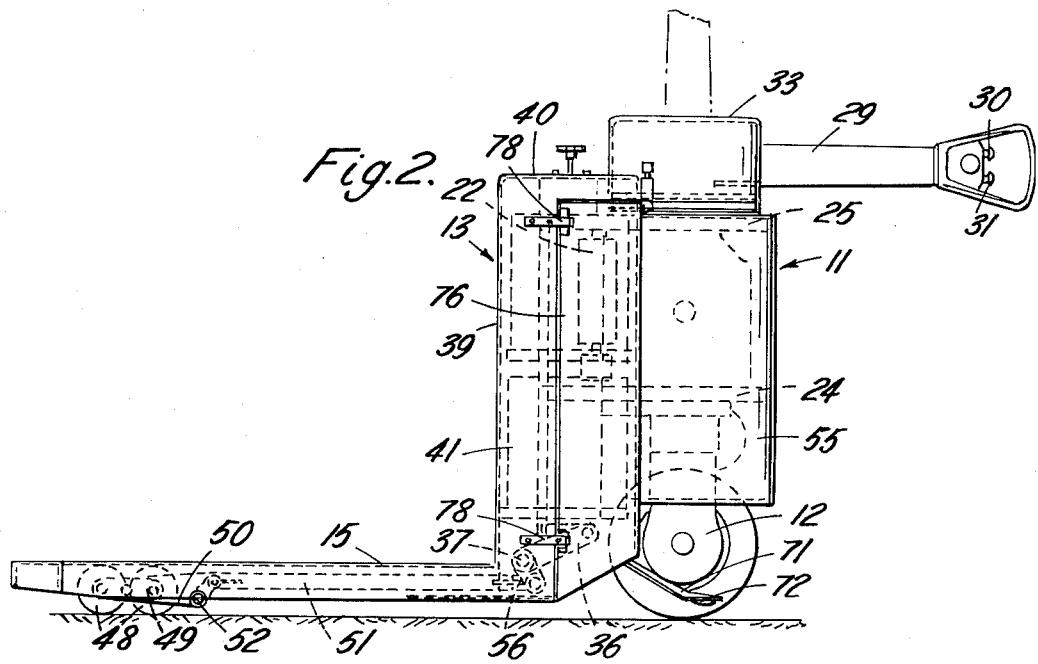

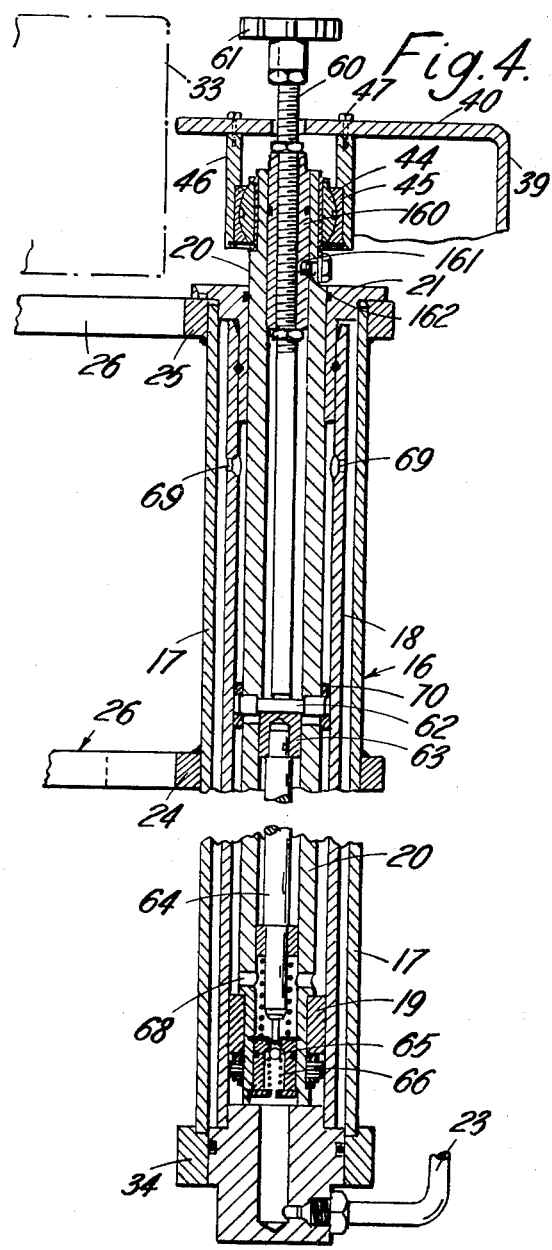

Aug. 24, 1965    J. R. V. DOLPHIN ETAL    3,202,233
PALLET OR STILLAGE TRUCKS
Filed May 6, 1963    4 Sheets-Sheet 4

INVENTORS
John R. V. Dolphin
Cecil Goodacre
By E. L. LeGates
ATTORNEY

United States Patent Office 3,202,233
Patented Aug. 24, 1965

3,202,233
PALLET OR STILLAGE TRUCKS
John Robert Vernon Dolphin and Cecil Goodacre, Basingstoke, England, assignors to Lansing Bagnall Limited, Basingstoke, England, a British company
Filed May 6, 1963, Ser. No. 278,177
Claims priority, application Great Britain,
May 7, 1962, 17,468/62
1 Claim. (Cl. 180—13)

The invention relates to industrial trucks and more particularly to pallet or stillage trucks.

The invention relates to industrial trucks for conveying pallets or stillages or the like of the type comprising a motor-driven wheel mounting and a carrier-frame therefor at one end to which frame there is attached a load-bearing section of the truck which comprises forwardly projecting fork-arms or a load platform, and hydraulic jack means to move the load-bearing section up and down relatively to the carrier-frame and to support the outer end of the platform or fork-arms from the ground at a height which accords with the height to which the platform or fork-arms have been adjusted. An example of such a construction is shown in United States Patent No. 2,823,621.

The invention comprises an industrial truck of the type described wherein the hydraulic jack means to move the load-bearing section up and down relatively to the carrier-frame is constituted by a jack element which itself forms part of the carrier-frame, the remainder of the frame being constituted by brackets on which the motor-driven wheel mounting can swing to execute steering movements.

Preferably the motor is an electric motor and the battery to supply the motor is mounted on the load-bearing section of the truck. The cylinder-element may be surrounded with a tank for hydraulic fluid and the tank may carry brackets in which the wheel mounting is rotatable like a turntable.

Preferably the battery is mounted in cupboards located one at each side of the load-bearing section of the truck, part of the battery being secured to the doors of the cupboards so that if the door is swung open the battery is exposed to view for servicing.

Preferably an electric motor-driven hydraulic pump is attached to the side of the combined hydraulic fluid tank and jack.

The swinging links between the carrier-frame and the load-bearing section preferably operate as levers which serve to raise or lower trail wheels near the outer ends of the pallet legs or load-platform.

Two stabilisers may be provided attached to the lower end of the frame which extend laterally one to each side of the truck and terminate a small distance above the ground; these stabilisers may comprise leaf springs and may have nylon or other wear-resistant material pads at their outer ends for engagement with the ground. Such stabilisers engage the ground when the truck tips about a longitudinal axis and prevent the truck from tipping to more than a small angle.

The following is a description, by way of example, of one construction of a pallet truck in accordance with the invention.

Figure 5:
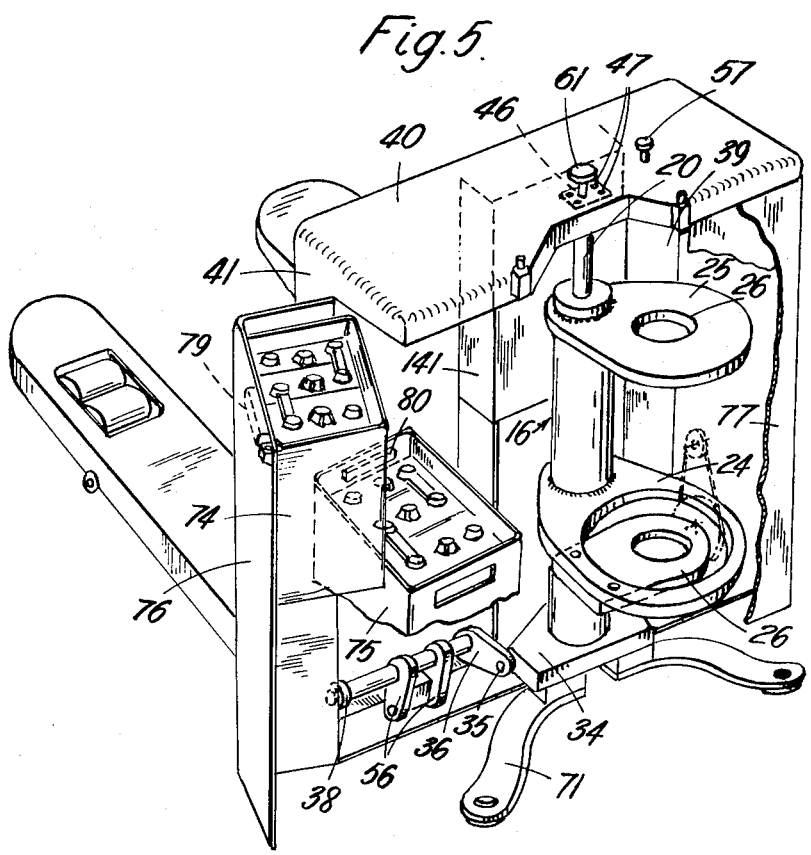

In the accompanying drawings:
FIGURE 1 is a perspective view of the truck,
FIGURE 2 is a side elevation,
FIGURE 3 is a plan,
FIGURE 4 is a vertical section through the hydraulic jack, and
FIGURE 5 is a perspective view similar to FIGURE 1 but with one of the doors which encloses the battery swung open, and with the motor-driven wheel mounting removed.

The truck shown in the drawings comprises two sections, namely, a rear section 11 which includes a motor-driven wheel mounting 12 and a carrier-frame therefor and front load-bearing section 13 which comprises forwardly-projecting fork-arms 14, 15.

The carrier-frame for the motor-driven wheel mounting 12 of the pallet truck is built up so as to include a combined hydraulic fluid reservoir and jack 16, best seen in section, in FIGURE 4, which comprises an outer cylindrical reservoir 17 enclosing a jack cylinder 18, the space between the cylinder 18 and the outer cylinder 17 constituting a reservoir space. A jack piston 19 works within the cylinder 18 having a piston rod 20 extending upwardly and out through the upper end-plate 21 of the reservoir 17. A motor-driven hydraulic fluid pump 22 strapped to the side of the reservoir 17, in the position indicated in dotted lines in the plan, FIGURE 3, has two fluid conduits connecting it on the one hand with the reservoir 17 and the other hand with a pipe 23 supplying the jack 18.

Two similar horizontal brackets 24, 25 are welded to the reservoir 17 one at the top and one about half way down. These brackets extend rearwardly and each is bored out with a large aperture so as to form a circular bearing ring 26. The mounting 12 for a ground-engaging steering wheel 27 is supported rotatably in the circular bearing rings of the brackets for steering movements, and supports an electric motor 28 and a sprocket on one end of the motor shaft is connected by a chain drive double reduction gear to the wheel 27. The wheel mounting with its motor is a standard unit and does not require further description here. It is described in British specification No. 780,487. A tiller 29 is mounted on a horizontal pivotal mounting in a block 32 at the top of the steering unit and can be moved about its pivot through an arc from a vertical position to a horizontal position. The outer end of the tiller carries controls 30, 31 for operation of the truck motor. Movement of the tiller about a vertical axis causes the steering unit to be moved with it in the rings 26 of the brackets 24, 25 and so steer the truck. A cover 33 encloses the tiller pivot and rotates with the mounting 12.

A laterally extending frame member 34, best seen in FIGURE 5, is welded to the lower end of the reservoir 17. Pivots 35 are provided at the outer ends of this lateral frame member and are engaged with levers 36 carried on rock-shafts 37 supported in bearings 38 between the side wall 41 and a central support 141 extending from the upright back 39 of the load-bearing section 13 of the truck.

The load-bearing section 13 of the pallet truck is constructed from stout steel plate and the upright portion 39 is like a box, with a top-plate 40 and side walls 41, all welded together and to the inverted channel-section fork-arms 14, 15. The load-bearing portion 13 also has stiffening members where necessary, such as the support 141.

The load-bearing portion 13 and carrier frame for the wheel mounting 12 are joined together at three points: the jack piston rod 20 is pivoted by a ball-and-socket joint 44, 45 to a hallow block 46 secured by set-screws 47 to the underside of the top-plate 40, and the two parallel levers 36 constitute further points of attachment at the bottom. These levers allow the load-bearing section 13 to be raised and lowered by the piston rod 20 whilst maintaining the load-bearing section 13 and the carrier frame 12 substantially vertical.

Two trail wheels 48 are mounted in a bogie 49 on a swinging arm 50 at the outer end of each of the pallet legs 14, 15. These arms can be swung to raise and lower the trail wheels by means of push rods 51 pivoted to the swinging arms 50 above their pivotal mounting 52 on the pallet legs 14, 15. The push rods extend to the back end of each of the pallet legs where they are pivoted to downwardly extending levers 56 on the rock-shafts 37, so that they are operated when the levers 36 swing, whenever the load-bearing section 13 of the truck is raised relatively to the rear section 11 which carries the steerable wheel-mounting 12.

By this means the load-bearing section 13 is kept level as it is raised. The mechanism for operating the trail-wheels 48 is well-known per se. The wheel mounting 12 is enclosed by a curved plate 55.

In operation, if the load-bearing section 13 is to be raised, the operator presses the control button 57 located on top of plate 40. This sets in motion the motor-pump 22 and oil is drawn from the reservoir 17 and delivered to pipe 23, and delivered to the underside of piston 19, so raising the ram 20 and with it the whole load-bearing section. A rod 60 housed in a sleeve 160 in the upper end of the ram passes upwardly through the ball-joint 44, 45 and carries a control knob 61. The lower end of the rod bears on a cross-bar 62 which overlies a block 63 within the ram 20, which is hollow, and the block 63 bears on the upper end of a valve-opening rod 64. Within the piston 19 is a ball-valve 65 held on its seat by a spring 66, and unless the ball-valve is displaced the oil-pressure from pipe 23 will maintain the jack-rod 20 extended. The sleeve 160 is provided with a spiral cam groove 161 which is engaged by a stop 162 screwed into the side of the ram 20 so that by turning the knob 61 the rod 60 is caused to move vertically. If the body portion 13 is to be lowered, the knob 61 is turned and causes the block 63 and rod 64 to move downwardly. The lower end of rod 64 is reduced in size and is small enough to enter the seat of valve 65 and displace it from its seat. Thereupon, oil will flow out of the lower part of jack-cylinder 18 around valve 65 into the hollow jack-rod 20 and thence by ports 68 into the space above the piston 19. Ports 69 in the upper part of cylinder 20 permit it to return to the reservoir space. Thus the piston 19 can be allowed to descend again, at a rate determined by the extent of rotation imparted by the operator to the knob 61, and the load-bearing section 13 of the truck is lowered to whatever level the operator desires.

Two stabilisers comprising leaf springs 71 are attached to the outer member of the combined reservoir and jack; these extend laterally one to each side of the truck and terminate a small distance above the ground. A nylon pad 72 is attached to the outer end of each stabiliser to engage the ground. The stabilisers engage the ground when the truck tips about a longitudinal axis and prevent the truck from tipping to more than a small angle.

It should be pointed out that the cross-bar 62 extends through apertures in the sides of the ram 20 which allow a certain amount of lost motion and enters a ring 70 surrounding the ram. The purpose of the ring 70 is to engage the underside of cover plate 21 when the ram reaches the top of its stroke and so to operate valve 65 and prevent further upward pressure.

One of the great advantages of the construction described is that the detachable wheel mounting and propulsion unit 11 is secured to the load-carrying element 13 at three points only, namely, by the ball joint 44, 45 and by the two pivots 35. Removal of the pivots, and unscrewing the set-screws 47 enables this unit, which contains all the operating parts of the mechanism to be readily removed and servicing is thus facilitated.

FIGURE 5 shows how the batteries 74, 75 which supply power for the unit 11 are located. The rectangular box-like upper portion of the load-carrying unit has on each side doors 76, 77 which are hinged at 78, as shown in FIGURE 2. Each door carries a block-shaped hook 79 on which the upper battery-box 74 is hung and the lower battery-box 75 is hung on a similar hook 80 fixed to the back portion 39. Flexible connections connect the batteries in the boxes 74, 75 together and to the unit 11. When the door is swung open, both the batteries are easily accessible for topping up and inspection and also the mechanism beneath the lower battery which includes the pivots 35, can easily be got at.

The invention is not limited to the details of the foregoing example, for example a load-platform may be provided in place of the pallet legs 14, 15, in which case the truck would be a stillage truck.

We claim:

An industrial truck comprising a load-bearing-section having ground-engaging wheels at one end thereof, a carrier frame including a hydraulic jack having a cylinder and a piston rod, said piston rod being connected to the other end of said load-bearing-section, vertically spaced brackets fixed to said cylinder and having portions thereof extending horizontally from said cylinder in the direction away from said load-bearing-section, each said portion having a circular aperture therein, said apertures being coaxial and vertically aligned, and a motor-driven wheel mounting rotatably and removably mounted in said apertures.

References Cited by the Examiner

UNITED STATES PATENTS

| | | | |
|---|---|---|---|
| 1,178,733 | 4/16 | Koken | 60—52 X |
| 2,422,538 | 6/47 | Framhein | 254—2.6 X |
| 2,601,171 | 6/52 | Schreck | 254—2.6 X |
| 3,000,358 | 9/61 | Marlow | 91—422 X |
| 3,043,388 | 7/62 | Kansen | 254—2.6 X |
| 3,072,418 | 1/63 | Becker | 280—43.12 |

SAMUEL F. COLEMAN, *Primary Examiner.*